Patented July 10, 1934

1,966,395

UNITED STATES PATENT OFFICE 1,966,395

PROCESS FOR PRODUCING CALCIUM NITRATE FERTILIZERS

Emil Lüscher and Ernst Stirnemann, Basel, Switzerland, assignors to the firm of Lonza Elektrizitatswerke und Chemische Fabriken Aktiengesellschaft, Basel, Switzerland, a corporation of Switzerland No Drawing. Application October 28, 1931, Serial No. 571,670. In Switzerland November 1, 1930

1 Claim. (Cl. 71—9)

The calcium nitrate commercially obtainable contains substantial amounts of water and has the property of deliquescing rapidly in the air. Anhydrous calcium nitrate has always hitherto been obtained in a very fine mealy form and is considered, in general, as even more hygroscopic than the ordinary water-containing calcium nitrate. There has, therefore, been proposed a method for producing from unsuitable calcined calcium nitrate a distributable product of small hygroscopicity by inoculating the calcined salt during its cooling with calcium nitrate containing water. The calcined calcium nitrate obtained in this way, on account of its high melting point, cannot be brought into the granular form advantageous for fertilizing purposes by the usual process, for example by spraying.

One object of the invention is to produce a non-caking readily distributable fertilizer containing calcium nitrate. Another object is to obtain a fine granular fertilizer from calcium nitrate which does not cake nor deliquesce. Still another object is to produce a non-caking readily distributable fertilizer containing calcium nitrate and any desired proportion of other fertilizers such as potash salts.

It has now been found that a readily distributable and non-caking product containing calcium nitrate especially suitable for fertilizing can be obtained by evaporating a calcium nitrate solution of about 90–95% calcium nitrate content (calculated as anhydrous calcium nitrate) and then converting the concentrated product into a crumbly mass by thermal treatment at a temperature not exceeding 100° C. This thermal treatment of the concentrated product is most advantageously effected at temperatures between 50 and 100° C.

By proceeding according to the present invention it has been unexpectedly found that the apparently non coherent product obtained in this way, in spite of its sandy appearance, rapidly sets on cooling to very hard granules which are much more non-caking and distributable than any calcium nitrate fertilizers previously known in commerce. This is especially the case with the ammonium nitrate-containing fertilizers hitherto so very susceptible to caking. It has further been ascertained that the product obtained according to the present invention deliquesces much less readily in the air and that the granules themselves on taking up the same amount of moisture, retain the compact non-caking form which is not the case with ordinary calcium nitrate.

The present process is advantageously carried out towards the end under vacuum in a kneading apparatus adapted to be heated and cooled.

It has further been found that the material being treated can also be mixed before or during the process, that is to say before the cooling, with other fertilizers without detrimentally affecting the desired properties, indicated above, of the product to be obtained. The material to be treated can be mixed, for example, with potash salts such as potassium nitrate, potassium chloride or potassium phosphate or mixtures of these.

It is already known to produce potash containing mixed fertilizers by introducing potash salts such as potassium nitrate into calcium nitrate solutions. It has been shown that to the usual calcium nitrate in the molten form not more than 20% of potassium nitrate can be added, as otherwise masses result which are extremely tough and difficult to work with. In contradistinction to this the calcium nitrate containing fertilizers obtainable by the present process can have incorporated with them any desired amounts of other fertilizing salts, for example potash salts, in the manner indicated. The products thus obtained are quite crumbly, always set rapidly and are readily distributable and resistant to caking.

Examples 1. 500 kg. of $Ca(NO_3)_2.4H_2O$ are melted in a kneading device adapted to be heated and the melt further evaporated under vacuum (down to 100 m. m. mercury) while the temperature is raised to 90° C. The melt, at first thinly liquid, becomes rapidly thick and immediately afterwards changes over to a sandy, crumbly mass. This can be easily brought into a granular form at 80° C. The granules set very rapidly and become hard. The nitrogen content of the product is 16.0%.

2. 440 kg. of acetylene mud which contains 27.1% CaO, 0.2% MgO, 1% $Fe_2O_3$ and $Al_2O_3$ and 1.25% $SiO_2$ is treated with so much 50% nitric acid (about 560 kg.) that a neutral solution results. This is evaporated to a calcium nitrate content of about 75%, then placed in a heated kneading machine and there further concentrated in vacuum. At 110° C. there results immediately a tough product and shortly afterwards a sandy, pasty mass. This can be easily pulverized at 80° C. The product so obtained crystallizes rapidly to compact, very hard granules. It contains 15.4% nitrogen.

3. 400 kg. of technical calcium nitrate solution (obtained by dissolving limestone in nitric acid) which contains 7.8% of nitrogen is evaporated in a kneading device until a crumbly, sandy mass results which contains 15.5% of nitrogen. To this is added at 110° C. 200 kg. of potassium nitrate and the whole thoroughly kneaded. It forms at 75° C. a mass which can readily be pulverized and on complete cooling sets to hard granules. The fertilizer has a content of 23% K$_2$O and 14.6% N.

4. 500 kg. of a technical calcium nitrate solution are evaporated in a kneading device until a crumbly mass results and this is then mixed at 105° C. with 138 kgs. of di-potassium phosphate, whereupon the whole is thoroughly kneaded. It forms a product which can be well disintegrated and which goes into hard granules containing 10% N, 19.2% K$_2$O and 14.4% P$_2$O$_5$.

We declare that what we claim is:—

The process for the production of a distributable, non-caking and granular calcium nitrate of an anhydrous character which comprises evaporating by heat an aqueous solution containing calcium nitrate to a concentration of about 90 to 95% (calculated as an anhydrous calcium nitrate) to produce a sandy, pasty mass, and subjecting said sandy, pasty mass to a temperature from about 50° C. to about 100° C. while subjecting the same to a mechanical treatment to convert said sandy, pasty mass to a granular product, said granular product being capable of being used as a distributable and non-caking fertilizer.

EMIL LÜSCHER.
ERNST STIRNEMANN.